(12) United States Patent
Audyli

(10) Patent No.: US 6,874,735 B1
(45) Date of Patent: Apr. 5, 2005

(54) AUTOMATED AIRLINE BAGGAGE TRANSPORTATION SYSTEM

(76) Inventor: Jeff Audyli, 1709 N. Sayre, Chicago, IL (US) 60707

( * ) Notice: Subject to any disclaimer, the term of this patent is extended or adjusted under 35 U.S.C. 154(b) by 0 days.

(21) Appl. No.: 10/678,923

(22) Filed: Oct. 6, 2003

(51) Int. Cl.⁷ .................................................. B64D 9/00
(52) U.S. Cl. .................................................. 244/137.1
(58) Field of Search .......................... 244/137.1, 114 R, 244/116, 115, 137.2; 198/860.3, 861.1, 860.5, 312; 193/2 R, 25 R, 25 C; 414/502, 503, 398, 393

(56) References Cited

U.S. PATENT DOCUMENTS

| | | | | |
|---|---|---|---|---|
| 2,260,587 A | * | 10/1941 | Shields | 198/303 |
| 2,875,457 A | * | 3/1959 | Read et al. | 14/71.5 |
| 3,147,852 A | * | 9/1964 | Hanson, Jr. | 198/860.5 |
| 3,561,623 A | | 2/1971 | McCaul | |
| 3,850,283 A | | 11/1974 | Nordstrom | |
| 4,170,293 A | | 10/1979 | Campbell | |
| 4,218,034 A | * | 8/1980 | Magill | 244/114 R |
| 4,344,726 A | | 8/1982 | Naffa | |
| 4,635,883 A | * | 1/1987 | Hamilton et al. | 244/137.1 |
| 5,033,605 A | * | 7/1991 | Marquart | 198/300 |
| 5,131,798 A | | 7/1992 | Bell et al. | |
| 5,169,011 A | | 12/1992 | Ebeling et al. | |
| 6,164,892 A | * | 12/2000 | Malloy et al. | 414/398 |
| 6,659,704 B2 | * | 12/2003 | Fukuhara et al. | 414/398 |
| 2003/0219329 A1 | * | 11/2003 | Ganiere | 414/399 |

* cited by examiner

Primary Examiner—Tien Dinh

(57) ABSTRACT

An automated airline baggage transportation system includes a tug connectable to an airplane and a plurality of guide rails for automatically directing an airplane to a gate terminal. The system further includes a plurality of flexible and elongated conveyor tubes selectively positionable between an airplane and an airport terminal, and a plurality of baggage loaders with adjustable arm loaders for guiding baggage between the plurality of conveyor tubes and an airplane. The plurality of adjustable arm loaders are connected to a plurality of shelves disposed in an airplane bin for assisting to transport the baggage between the shelves and the conveyor tubes. An adjustable gate pier including a plurality of baggage chutes is connected to a gate terminal and is selectively extendable outwardly and away from a gate terminal so that baggage can be presorted for transportation towards or away from an airplane via the plurality of conveyor tubes.

15 Claims, 10 Drawing Sheets

AUTOMATED AIRLINE BAGGAGE TRANSPORTATION SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to baggage handling systems and, more particularly, to automated airport baggage handling systems.

2. Prior Art

Current methods of handling baggage at airline terminals employ tractor or tug drawn carts shuttling between the terminal and baggage receiving and delivery areas in the terminal and require several manual loading and unloading operations involving the handling of each article. These methods are labor intensive and increase the risk of damage to articles within the baggage. Instances of delay, loss, damage, and misrouting multiply with the increasing size of aircraft and number of passengers as does the costs of baggage handling to carriers. Newer and larger aircraft are equipped with baggage and cargo containers, but the use of these containers has not reduced the amount of manual handling, particularly of baggage.

Airline companies are continually striving to find ways to decrease costs, particularly labor, due to the comparably high wages paid in this mostly unionized industry. The implementation of a baggage handling system that minimizes the amount of manpower necessary and the number of times each article is handled in the transfer of baggage between receiving and delivery areas in the terminal would help reduce costs by decreasing the number of employees required to handle baggage. Such a system would also improve the sorting of baggage to decrease the number of misrouted or lost articles and expedite the receipt of baggage by passengers at the baggage delivery area.

Accordingly, a need remains for an automated airline baggage handling system that reduces labor costs, improves sorting and routing, and expedites delivery.

BRIEF SUMMARY OF THE INVENTION

In view of the foregoing background, it is therefore an object of the present invention to provide an improved system for handling airline baggage. These and other objects, features, and advantages of the invention are provided by an automated airline baggage transportation system including a tug connectable to a front end of an airplane and a plurality of guide rails for directing the tug along a predetermined path so that an airplane can be automatically towed to a gate terminal upon arrival at an airport. The system further includes a plurality of flexible and elongated conveyor tubes having opposed end portions selectively positionable between an airplane and an airport terminal, respectively. A plurality of baggage loaders are removably attachable to the end portions, respectively, for guiding baggage between the plurality of conveyor tubes and an airplane.

The system further includes a plurality of adjustable shelves disposable within an airplane bin and for receiving baggage thereon. The plurality of shelves each includes a top surface and a plurality of dividers connected thereacross for assisting to separate baggage placed thereon and for cooperating with the plurality of conveyor tubes for allowing baggage to be transported therebetween. The plurality of conveyor tubes have a bottom surface and a plurality of rollers, respectively, connected thereto for allowing the plurality of conveyor tubes to be easily maneuvered between predetermined locations.

The plurality of baggage loaders include a plurality of elongated guide rails spaced apart from each other and substantially aligned along a width of the plurality of baggage loaders so that same can be guided upwardly towards an airplane storage bin. The plurality of adjustable arm loaders are connected to the plurality of baggage loaders and the plurality of shelves, respectively, for assisting to transport baggage between select ones of the plurality of shelves and the plurality of conveyor tubes.

The system may further include an adjustable gate pier connected to a gate terminal and, which is selectively extendable outwardly and away from a gate terminal so that baggage can be presorted for transportation towards an associated airplane via the plurality of conveyor tubes. The gate pier includes a plurality of baggage chutes spaced apart from each other and for directing baggage to predetermined areas. The plurality of conveyor tubes are positioned adjacent the plurality of baggage chutes so that baggage can be transported directly from an airplane to the gate pier.

The system further includes a plurality of cans including a plurality of shelves and a plurality of rollers connected thereto for assisting the plurality of shelves to be repositioned within the plurality of cans and for facilitating the transportation of baggage into and out of the plurality of cans.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

Figure 1:
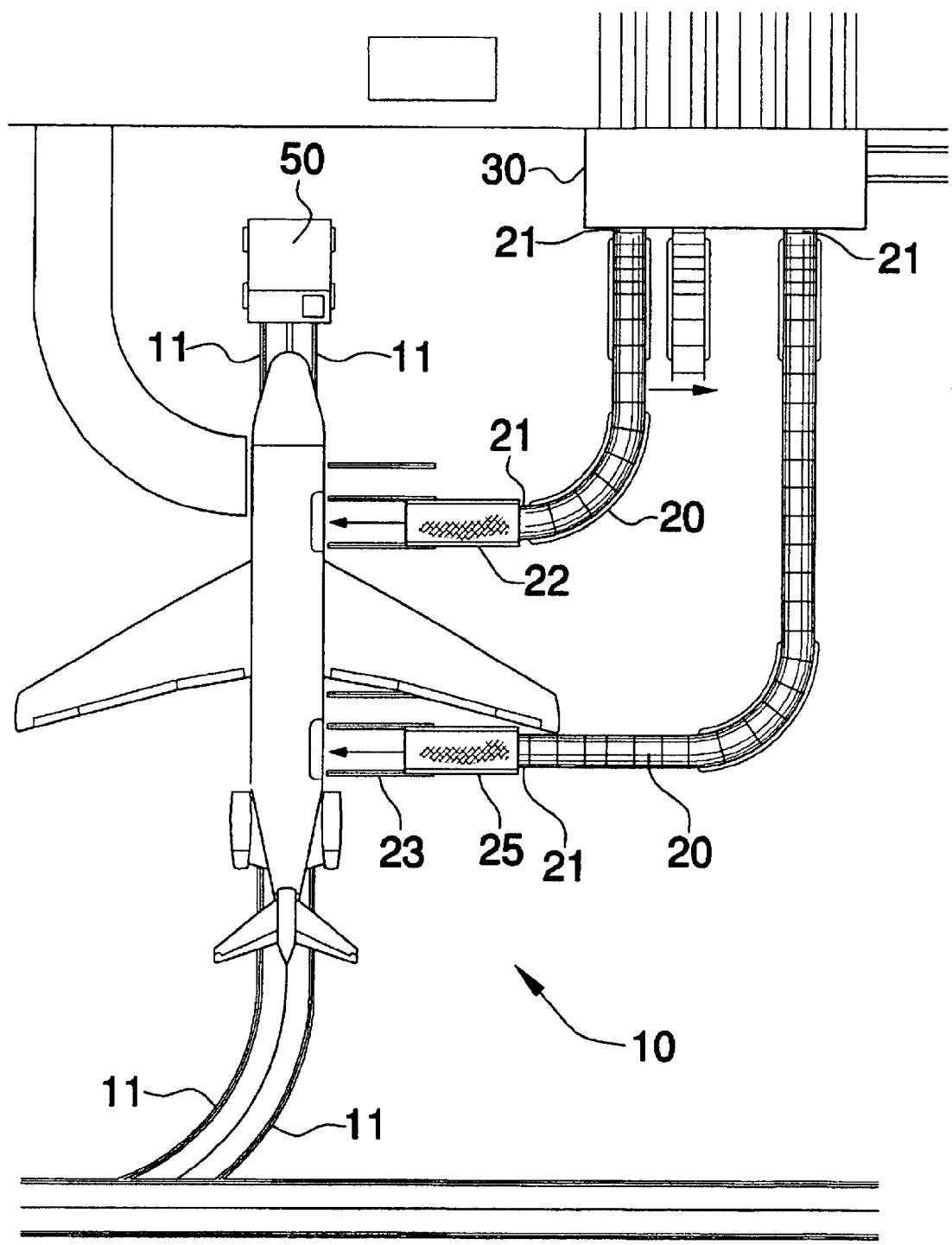
FIG. 1 is a top plan view of an automated airline baggage transportation system, in accordance with the present invention.
Figure 7:
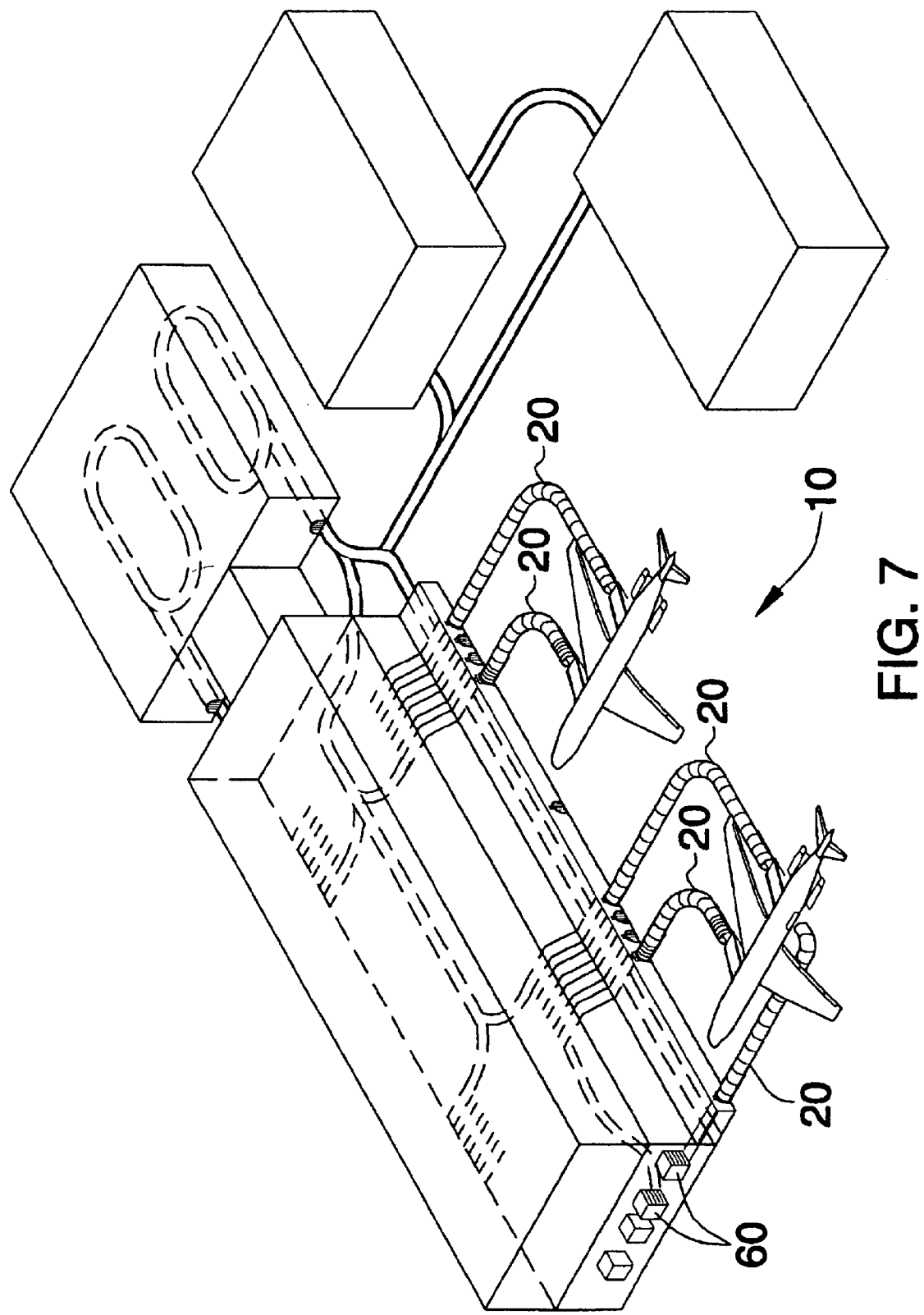
FIG. 7 is a perspective view of an automated airline baggage transportation system.

The system of this invention is referred to generally in FIGS. 1 and 7 by the reference numeral 10 and is intended to provide an automated airline baggage transportation system. It should be understood that the system 10 may be used to transport many different types of objects in airports and should not be limited to transporting only baggage. Such a baggage transportation system helps alleviate the congestion typically encountered for local flights, transferred flights, cancelled flights, changed flights, late arriving passengers, etc.

Figure 2:
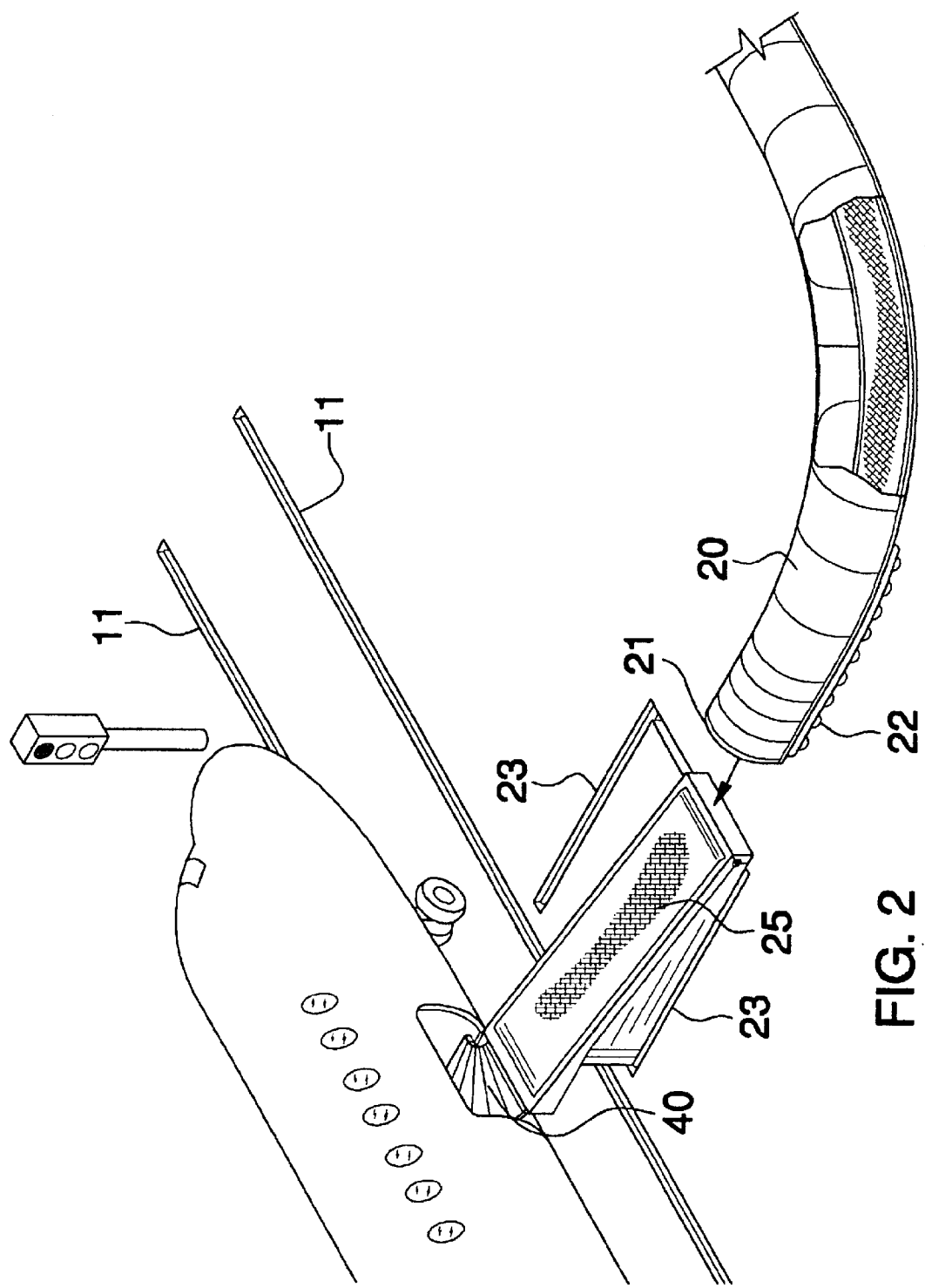
FIG. 2 is a perspective view of the conveyor tubes and baggage loaders in a preferred environment.
Figure 3:
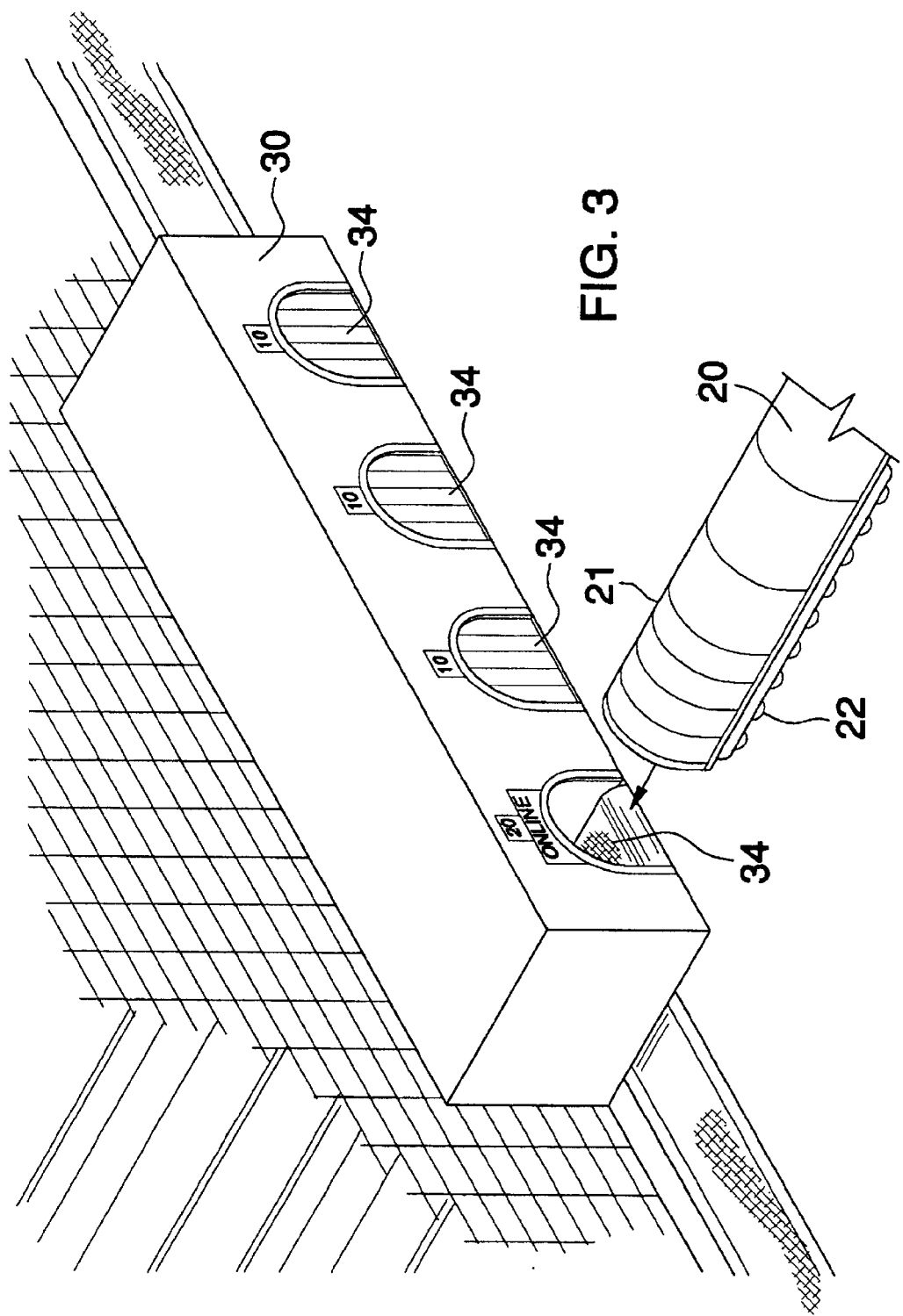
FIG. 3 is a perspective view of a gate pier with baggage chutes.

Referring to FIGS. 1 and 2, the system 10 includes a tug 50 connectable to a front end of an airplane. A plurality of guide rails 11 help direct the tug 50 along a predetermined path so that an airplane can be automatically towed to a gate terminal. The system 10 further includes a plurality of flexible and elongated conveyor tubes 20 having opposed end portions 21 selectively positionable between an airplane and an airport terminal, respectively. The use of guide rails 11 and tugs 50 eliminate the necessity of having a tug driver, thereby reducing labor costs and eliminating the wait for an available tug driver. Advantageously, the guide rails 11 assist less experienced workers with less skill to push back the plane and do their job.

The plurality of conveyor tubes 20 have a bottom surface 21 and include a plurality of rollers 22 connected thereto for allowing the plurality of conveyor tubes 20 to be easily maneuvered between predetermined locations. The system 10 includes a plurality of baggage loaders 25 removably attachable to end portions 21, respectively, for guiding baggage between the plurality of conveyor tubes 20 and an airplane. The plurality of baggage loaders 25 include a plurality of elongated guide rails 23 spaced apart from each other and substantially aligned along a width of the plurality of baggage loaders 25 so that same can be guided upwardly towards an airplane storage bin.

Figure 4:
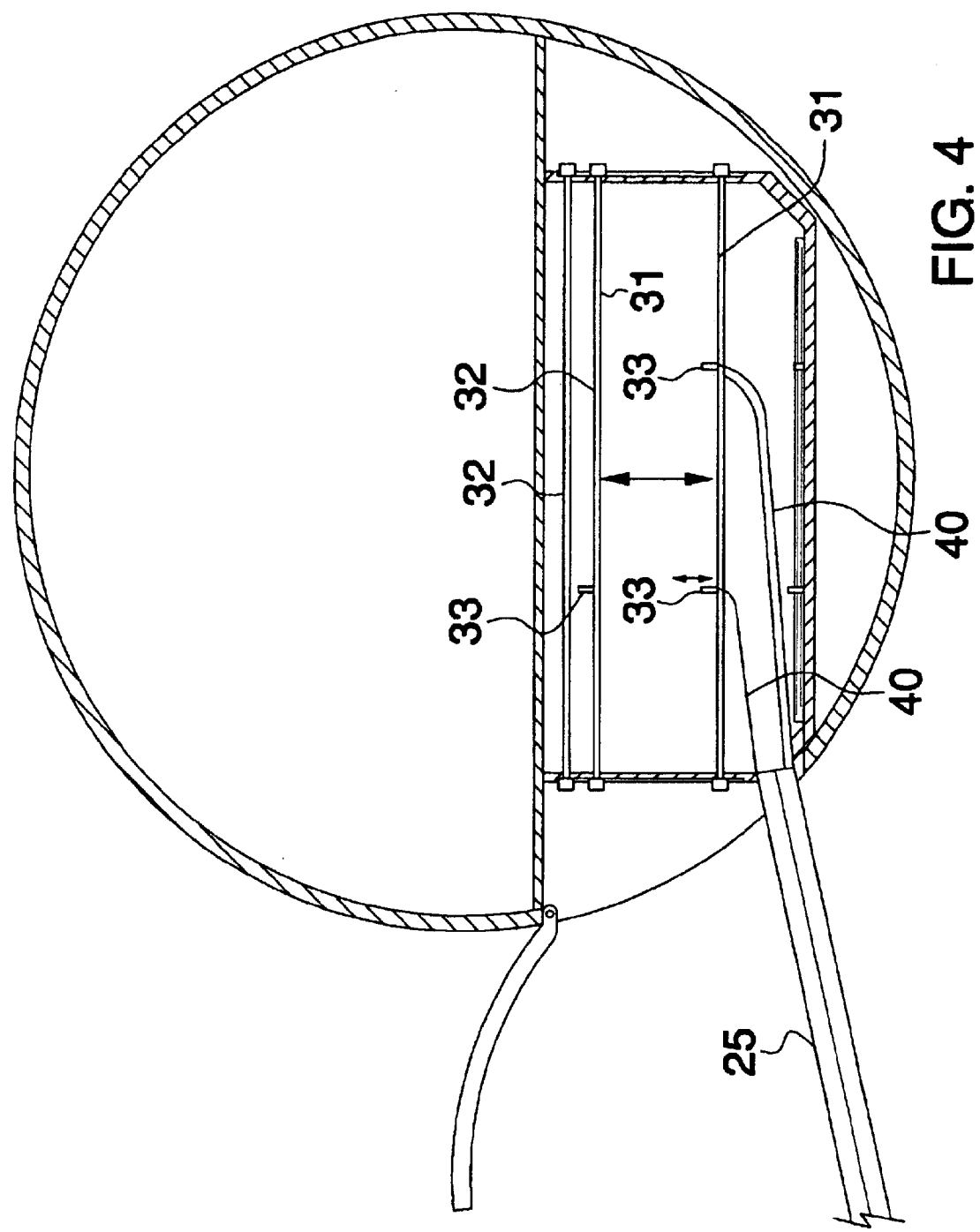
FIG. 4 is a cross-sectional view of an airplane bin and baggage loader with adjustable arm loaders.
Figure 5:
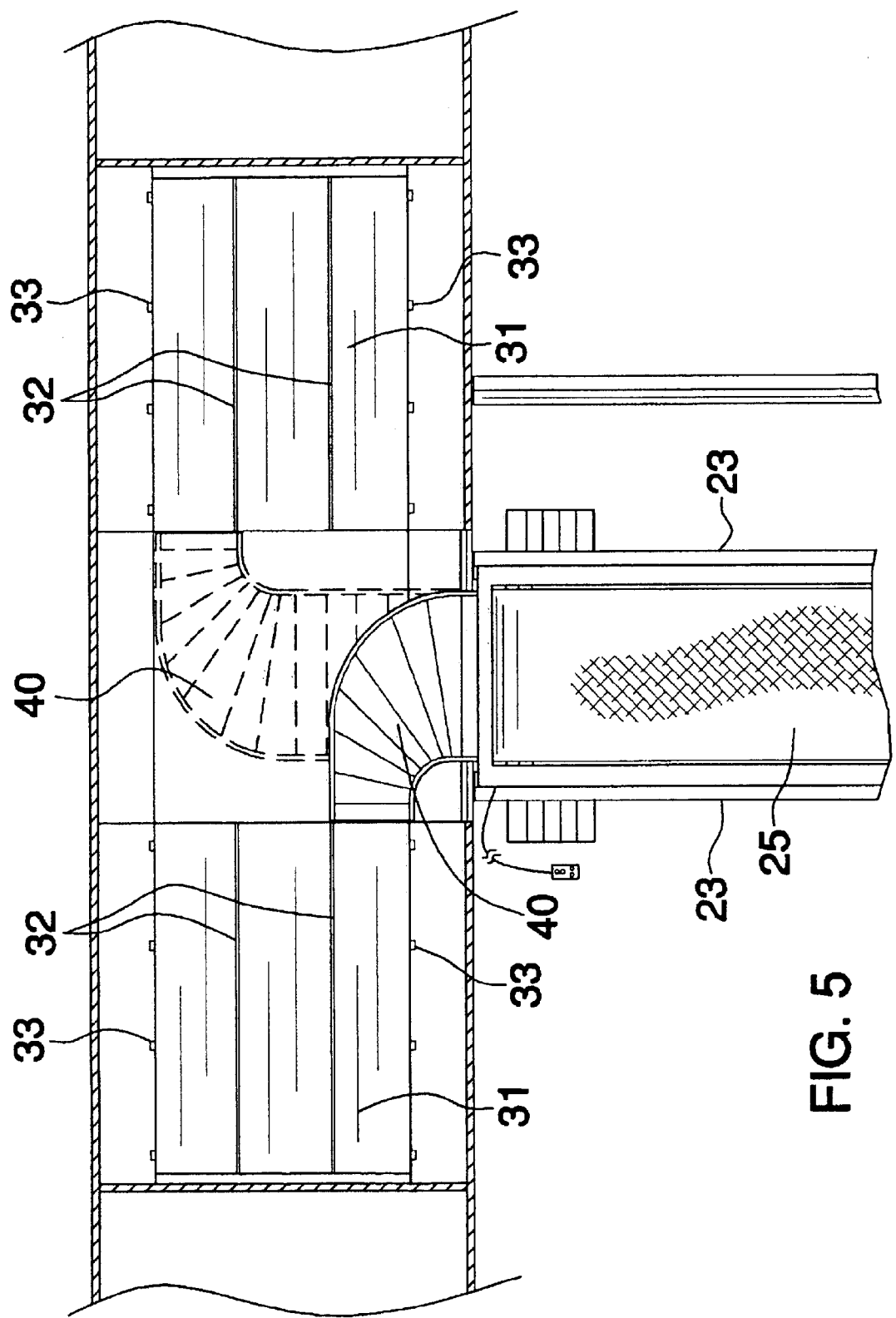
FIG. 5 is a cross-sectional view of the airplane bin and baggage loader with adjustable arm loaders shown in FIG. 4.
Figure 6:
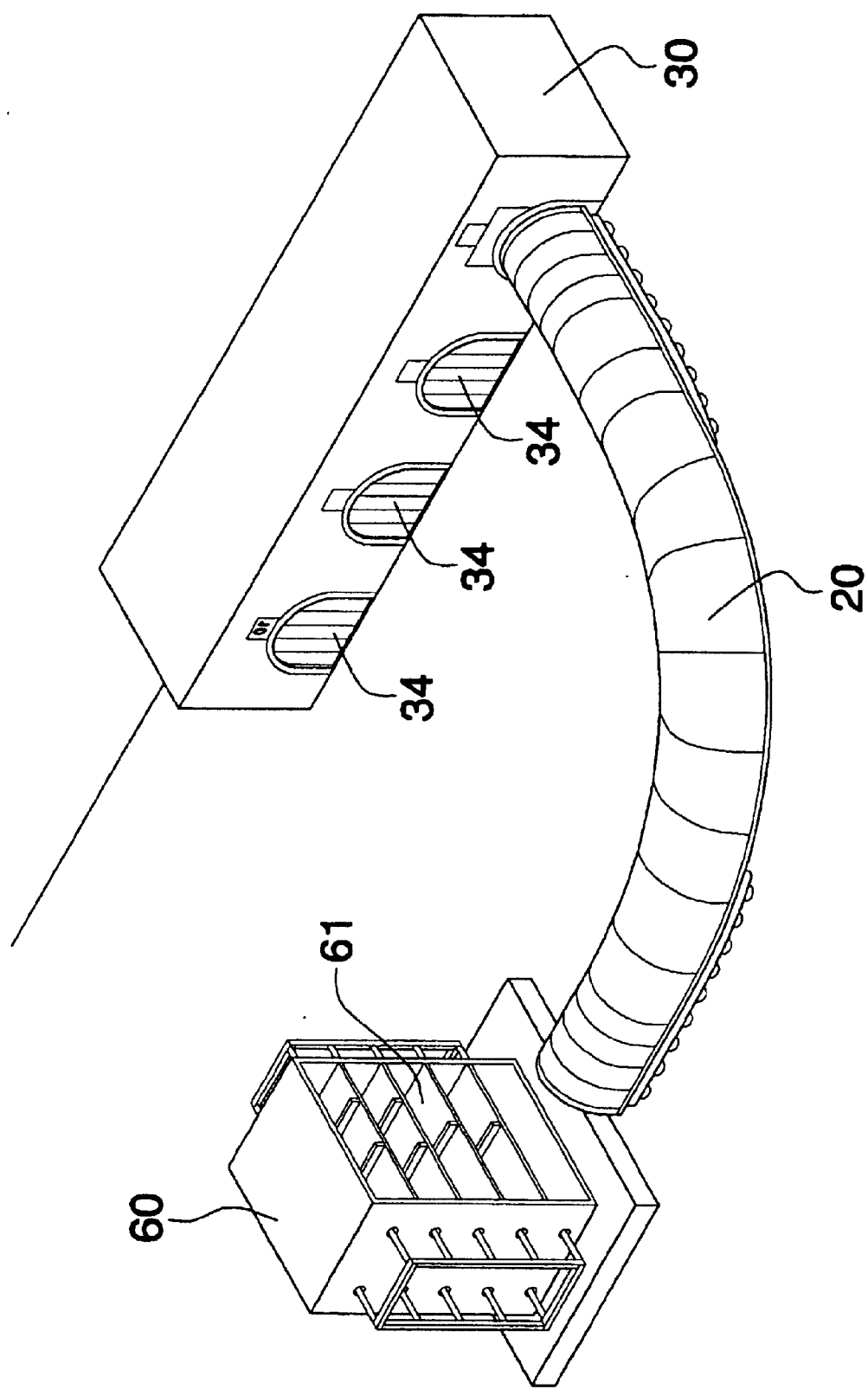
FIG. 6 is a perspective view of a can and a gate pier with a conveyor tube attached therebetween.

Now referring to FIGS. 4 and 5, the system 10 further includes a plurality of adjustable shelves 31 disposable within an airplane bin and for receiving baggage thereon. The plurality of shelves 31 have a top surface 32 and include a plurality of dividers 33 connected thereacross for assisting to separate baggage placed thereon. The plurality of adjustable shelves 31 cooperate with the plurality of conveyor tubes 20 for allowing baggage to be transported therebetween. The system 10 further includes a plurality of adjustable arm loaders 40 connectable to the plurality of baggage loaders 25 and the plurality of shelves 31, respectively.

Such arm loaders 40 assist to transport baggage between select ones of the plurality of shelves 31 and the plurality of conveyor tubes 20. The use of the baggage loaders 25 and adjustable arm loaders 40 help eliminate double handling of baggage out of the airplane and into the terminal, thereby reducing labor costs and damage from handling. Advantageously, if human remains are being transported in a coffin, baggage may be placed thereabove and not thereon with the use of the slidably adjustable shelves 31. Furthermore, by using the adjustable arm loaders 40 with the plurality of shelves 31, the middle shelf can be loaded because the door will not interfere with the loading and removing processes. Currently, industry practice typically requires a person to be stationed between the shelves 31, which can receive a substantially amount of baggage. As noted above, the plurality of shelves 31 also assists in preventing smaller baggage from being crushed by larger baggage.

Now referring to FIGS. 3, 6, 9, 10 and 11 the system 10 further includes an adjustable gate pier 30 connected to a gate terminal. The terminal includes a pair of transfer belts leading to the terminal gate, another terminal or local bags. The gate pier 30 is selectively extendable outwardly and away from a gate terminal so that baggage can be presorted for transportation towards an associated airplane or terminal via the plurality of conveyor tubes 20. The gate pier 30 includes a plurality of baggage chutes 34 spaced apart from each other and for directing baggage to predetermined areas by receiving same from the plurality of conveyor tubes 20 adjustably positionable thereat so that baggage can be transported directly from an airplane to the gate pier 30, as perhaps best shown in FIG. 9.

Figure 10:
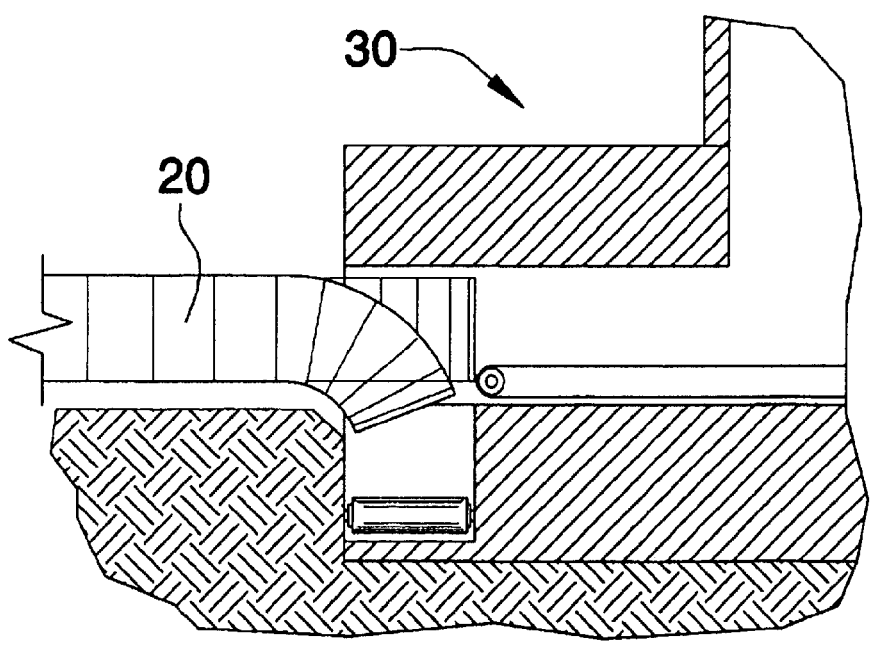
FIG. 10 is a cross-sectional view of a gate pier receiving a conveyor tube.
Figure 11:
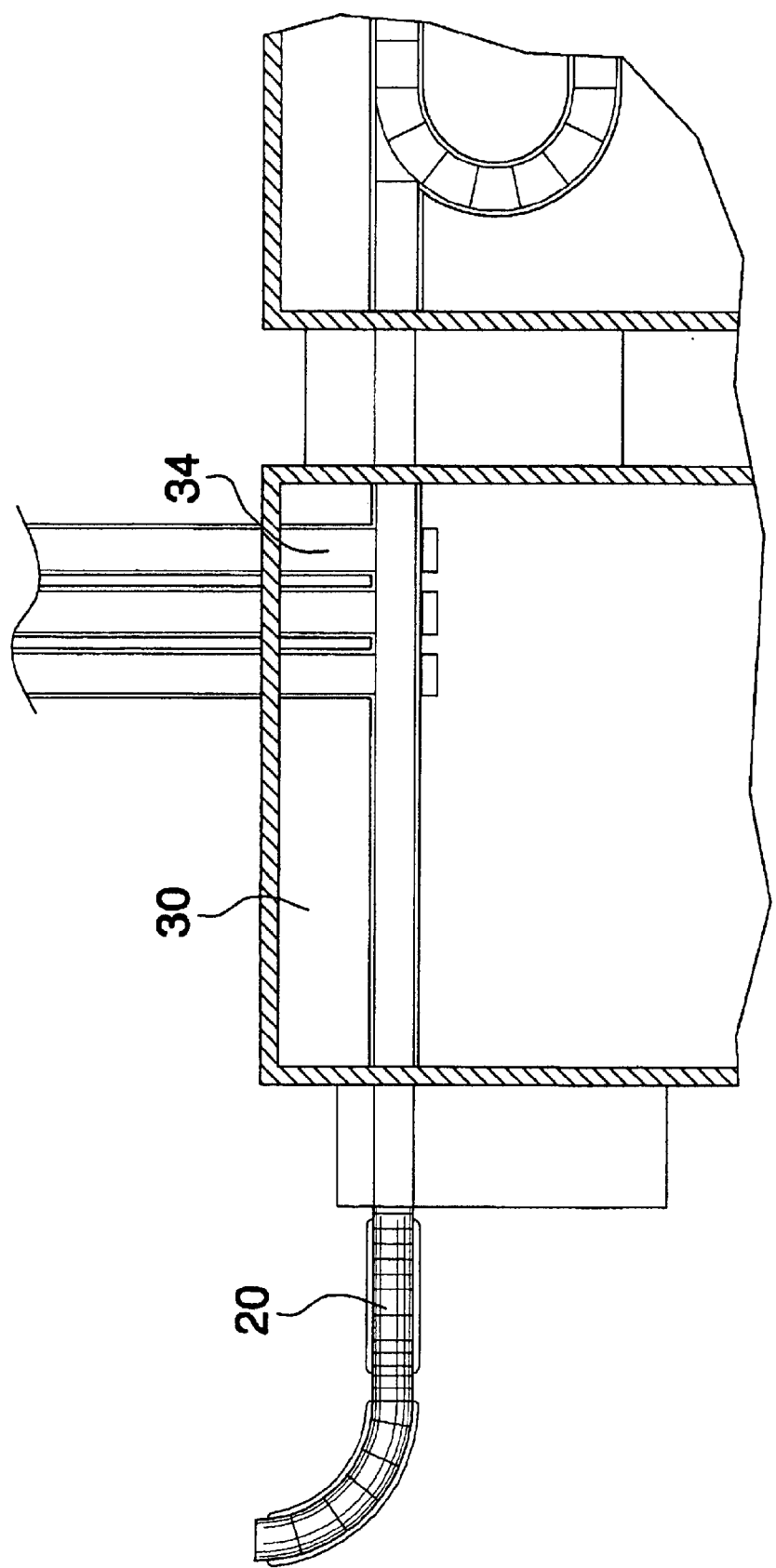
FIG. 11 is a cross-sectional view of a baggage conveyor system inside a gate pier and terminal.

Such baggage chutes 34 provide a straight lane to the ramp to thereby reduce the likelihood of baggage jams and improve the recognition of change order baggage. Referring specifically to FIG. 10, although only one belt is shown as receiving baggage from the flexible conveyor tube 20, it should be understood that a second separate belt may also be included in the present invention to receive transfer baggage. Of course, if the scanning system is working properly, transfer baggage may be transferred via bag runners to help alleviate congestion, as well known in the industry.

This allows baggage to be sorted quickly when it is removed from the airplane rather than transporting it into the terminal for sorting. Advantageously, long baggage such as skis and golf bags, for example, can be placed in any lane exiting the pier 30, which is most convenient. Advantageously, during offload situations, the pair of transfer belts can be employed alternately so that after a conveyor tube 20 has transported the local baggage via on belt, for example, it would extend to the other belt if there is any connecting transfer baggage. Also, the separate transfer belt relieves congestion between the local and transfer baggage, if the scanner is malfunctioning.

Figure 8:
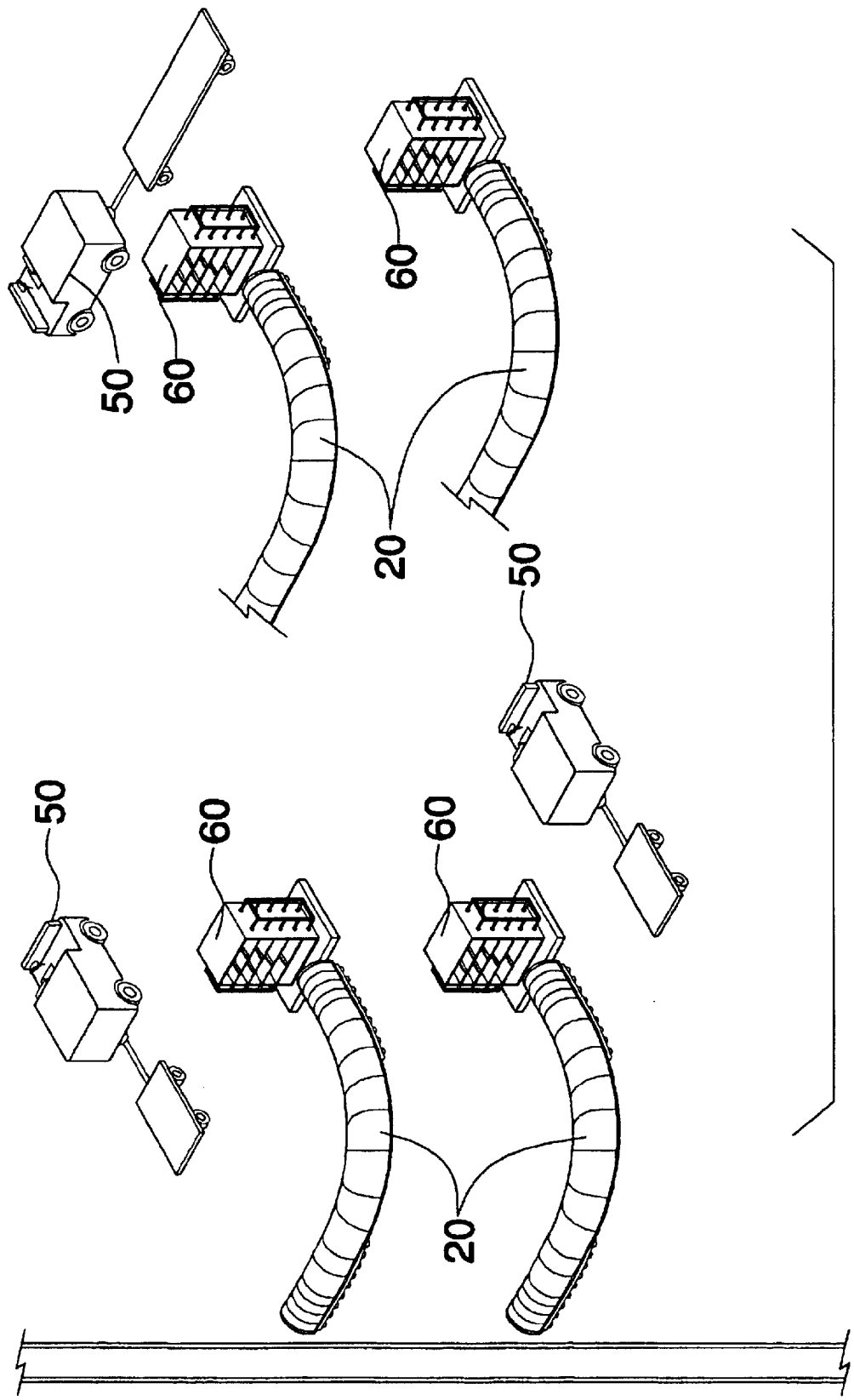
FIG. 8 is a perspective view of a plurality of tugs and a plurality of conveyor tubes adjustably attached to a plurality of corresponding cans.
Figure 9:
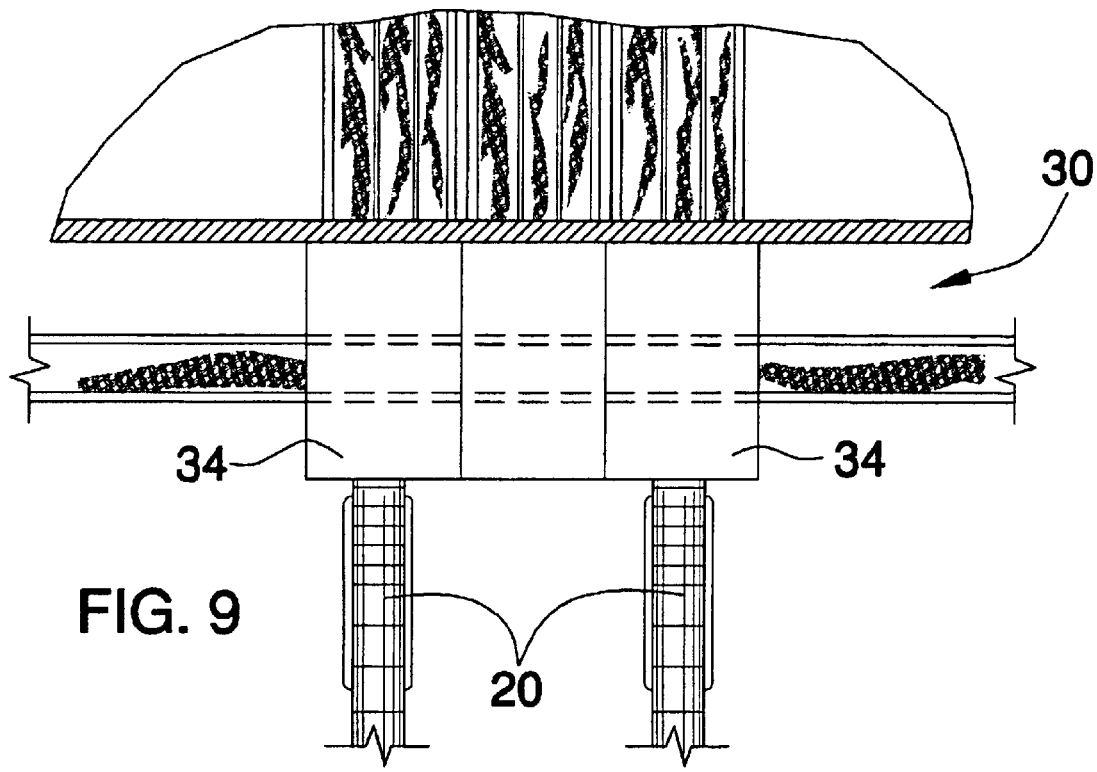
FIG. 9 is a top view of a gate pier with conveyor tubes attached thereto.

Referring back to FIG. 6 and to FIG. 8, the system 10 further includes a plurality of cans 60 including a plurality of shelves 61 and a plurality of rollers 62 (not shown) connected thereto for assisting the plurality of shelves 61 to be repositioned within the plurality of cans 60 and for facilitating the transportation of baggage into and out of the plurality of cans 60. The plurality of cans 60 may be loaded into an airplane without removing the baggage and are preferably used for containerized flights such as international flights that fly less often and have longer load times.

Advantageously, the plurality of cans 60 may be removably attached to the plurality of conveyor tubes 20 so that objects can be transported via the plurality of conveyor tubes 20 between remote locations. If select objects are not positionable within the plurality of conveyor tubes 20, the tugs 50 may be used to transport the cans 60, as needed. The plurality of conveyor tubes 20 may be selectively positioned against the local and transfer belts in the gate pier so that select ones of the plurality of cans 60 can receive only one type of baggage such as local, online, connecting or international baggage, for example.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An airline baggage transportation system comprising:
   a plurality of flexible and elongated conveyor tubes having opposed end portions selectively positionable between an airplane and an airport terminal respectively;
   a plurality of baggage loaders being removably attachable to said end portions respectively and for guiding baggage between said plurality of conveyor tubes and an airplane, said plurality of baggage loaders including a plurality of elongated guide rails spaced apart from each other and substantially aligned along a width of said plurality of baggage loaders so that same can be guided upwardly towards an airplane storage bin;
   an adjustable gate pier connected to a gate terminal and being selectively extendable outwardly and away from a gate terminal so that baggage can be presorted for transportation towards an associated airplane via said plurality of conveyor tubes; and
   a plurality of adjustable shelves disposable within an airplane bin and for receiving baggage thereon, said plurality of shelves each having a top surface and including a plurality of dividers connected thereacross for assisting to separate baggage placed thereon, said plurality of adjustable shelves cooperating with said plurality of conveyor tubes for allowing baggage to be transported therebetween.

2. The system of claim 1 wherein said plurality of conveyor tubes have a bottom surface and include a plurality of rollers connected thereto for allowing said plurality of conveyor tubes to be easily maneuvered between predetermined locations.

3. The system of claim 1, further comprising:
   a tug connectable to a front end of an airplane; and
   a plurality of guide rails for directing said tug along a predetermined path so that an airplane can be automatically towed to a gate terminal.

4. The system of claim 1, wherein said gate pier includes a plurality of baggage chutes spaced apart from each other and for directing baggage to predetermined areas, said plurality of conveyor tubes being positionable adjacent said plurality of baggage chutes so that baggage can be transported directly from an airplane to said gate pier.

5. The system of claim 1, further comprising a plurality of adjustable arm loaders connectable to said plurality of baggage loaders and said plurality of shelves respectively, said plurality of arm loaders for assisting to transport baggage between select ones of said plurality of shelves and said plurality of conveyor tubes.

6. The system of claim 1, further comprising a plurality of cans including a plurality of shelves and a plurality of rollers connected thereto for assisting said plurality of shelves to be repositioned within said plurality of cans and for facilitating the transportation of baggage into and out of said plurality of cans.

7. An airline baggage transportation system comprising:
   a plurality of flexible and elongated conveyor tubes having opposed end portions selectively positionable between an airplane and an airport terminal respectively, said plurality of conveyor tubes have a bottom surface and include a plurality of rollers connected thereto for allowing said plurality of conveyor tubes to be easily maneuvered between predetermined locations;
   a plurality of baggage loaders being removably attachable to said end portions respectively and for guiding baggage between said plurality of conveyor tubes and an airplane, said plurality of baggage loaders including a plurality of elongated guide rails spaced apart from each other and substantially aligned along a width of said plurality of baggage loaders so that same can be guided upwardly towards an airplane storage bin;
   an adjustable gate pier connected to a gate terminal and being selectively extendable outwardly and away from a gate terminal so that baggage can be presorted for transportation towards an associated airplane via said plurality of conveyor tubes; and
   a plurality of adjustable shelves disposable within an airplane bin and for receiving baggage thereon, said plurality of shelves each having a top surface and including a plurality of dividers connected thereacross for assisting to separate baggage placed thereon, said plurality of adjustable shelves cooperating with said plurality of conveyor tubes for allowing baggage to be transported therebetween.

8. The system of claim 7, further comprising:
   a tug connectable to a front end of an airplane; and
   a plurality of guide rails for directing said tug along a predetermined path so that an airplane can be automatically towed to a gate terminal.

9. The system of claim 7, wherein said gate pier includes a plurality of baggage chutes spaced apart from each other and for directing baggage to predetermined areas, said plurality of conveyor tubes being positionable adjacent said plurality of baggage chutes so that baggage can be transported directly from an airplane to said gate pier.

10. The system of claim 7, further comprising a plurality of adjustable arm loaders connectable to said plurality of baggage loaders and said plurality of shelves respectively, said plurality of arm loaders for assisting to transport baggage between select ones of said plurality of shelves and said plurality of conveyor tubes.

11. The system of claim 7, further comprising a plurality of cans including a plurality of shelves and a plurality of rollers connected thereto for assisting said plurality of shelves to be repositioned within said plurality of cans and for facilitating the transportation of baggage into and out of said plurality of cans.

12. An airline baggage transportation system comprising:

a plurality of flexible and elongated conveyor tubes having opposed end portions selectively positionable between an airplane and an airport terminal respectively, said plurality of conveyor tubes have a bottom surface and include a plurality of rollers connected thereto for allowing said plurality of conveyor tubes to be easily maneuvered between predetermined locations;

a plurality of baggage loaders being removably attachable to said end portions respectively and for guiding baggage between said plurality of conveyor tubes and an airplane, said plurality of baggage loaders including a plurality of elongated guide rails spaced apart from each other and substantially aligned along a width of said plurality of baggage loaders so that same can be guided upwardly towards an airplane storage bin;

an adjustable gate pier connected to a gate terminal and being selectively extendable outwardly and away from a gate terminal so that baggage can be presorted for transportation towards an associated airplane via said plurality of conveyor tubes, said gate pier including a plurality of baggage chutes spaced apart from each other and for directing baggage to predetermined areas, said plurality of conveyor tubes being positionable adjacent said plurality of baggage chutes so that baggage can be transported directly from an airplane to said gate pier; and a plurality of adjustable shelves disposable within an airplane bin and for receiving baggage thereon, said plurality of shelves each having a top surface and including a plurality of dividers connected thereacross for assisting to separate baggage placed thereon, said plurality of adjustable shelves cooperating with said plurality of conveyor tubes for allowing baggage to be transported therebetween.

13. The system of claim 12, further comprising:

a tug connectable to a front end of an airplane; and a plurality of guide rails for directing said tug along a predetermined path so that an airplane can be automatically towed to a gate terminal.

14. The system of claim 12, further comprising a plurality of adjustable arm loaders connectable to said plurality of baggage loaders and said plurality of shelves respectively, said plurality of arm loaders for assisting to transport baggage between select ones of said plurality of shelves and said plurality of conveyor tubes.

15. The system of claim 12, further comprising a plurality of cans including a plurality of shelves and a plurality of rollers connected thereto for assisting said plurality of shelves to be repositioned within said plurality of cans and for facilitating the transportation of baggage into and out of said plurality of cans.

* * * * *